US008699689B2

(12) United States Patent
Sundaram et al.

(10) Patent No.: US 8,699,689 B2
(45) Date of Patent: *Apr. 15, 2014

(54) METHOD AND SYSTEM FOR MONITORING AND MANAGING MULTI-SOURCED CALL CENTERS

(75) Inventors: Mukesh Sundaram, San Jose, CA (US); Prem Uppaluru, Cupertino, CA (US)

(73) Assignee: Transera Communications, Inc., Sunnyvale, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/794,277

(22) Filed: Jun. 4, 2010

(65) Prior Publication Data

US 2010/0246801 A1   Sep. 30, 2010

Related U.S. Application Data

(63) Continuation of application No. 11/285,599, filed on Nov. 22, 2005, now Pat. No. 7,738,646.

(60) Provisional application No. 60/630,851, filed on Nov. 23, 2004.

(51) Int. Cl.
*H04M 7/00* (2006.01)
*H04M 3/00* (2006.01)

(52) U.S. Cl.
USPC ............ 379/220.01; 379/221.01; 379/265.01; 379/265.02; 379/265.06; 379/266.01

(58) Field of Classification Search
USPC ............... 379/220.01, 256.01, 112.1, 221.01, 379/221.03, 229, 231, 265.01, 265.02, 379/265.06, 266.01, 266.04, 266.1
See application file for complete search history.

(56) References Cited

U.S. PATENT DOCUMENTS

| | | | | |
|---|---|---|---|---|
| 5,335,268 A | * | 8/1994 | Kelly et al. | 379/112.05 |
| 5,452,350 A | | 9/1995 | Reynolds et al. | |
| 5,590,188 A | | 12/1996 | Crocket | |
| 5,633,924 A | * | 5/1997 | Kaish et al. | 379/266.03 |

(Continued)

FOREIGN PATENT DOCUMENTS

| | | |
|---|---|---|
| WO | 99/13635 A | 3/1999 |
| WO | 99/66699 A | 12/1999 |
| WO | 02/35804 A | 5/2002 |

OTHER PUBLICATIONS

Transera Communications, PCT/US2005/042324, International Search Report and Written Opinion, Mar. 27, 2006, 11 pp.

*Primary Examiner* — Oleg Asanbayev

(74) *Attorney, Agent, or Firm* — Ascenda Law Group, PC

(57) ABSTRACT

A mid-point call management node subject to monitoring through a workstation communicatively coupled thereto, provides call services (e.g., through extensible markup language (XML), and in particular call control extensible markup language (CCXML) and/or voice extensible markup language (VXML), instructions) for an inbound call received from an originating network at an originating point-of-presence (POP) associated with multiple, disparate call centers, the call services being provided in response to call management application instructions issued according to enterprise-specific strategies for optimizing call handling between the originating POP and domestic and/or international ones of the disparate call centers communicatively coupled thereto. Call center information (e.g., call load information) received at the management node from the multiple call centers may be used in connection with providing the call services. The enterprise-specific strategies may be instantiated as processes for: call routing, load balancing, work force management, and/or customer relationship management.

9 Claims, 4 Drawing Sheets

(56) References Cited

U.S. PATENT DOCUMENTS

| | | | |
|---|---|---|---|
| 5,915,012 A * | 6/1999 | Miloslavsky | 379/265.02 |
| 5,940,496 A | 8/1999 | Gisby et al. | |
| 6,011,844 A | 1/2000 | Uppaluru et al. | |
| 6,246,752 B1 | 6/2001 | Bscheider et al. | |
| 6,470,008 B1 * | 10/2002 | Khuc | 370/352 |
| 6,744,878 B1 | 6/2004 | Komissarchik et al. | |
| 7,136,477 B2 * | 11/2006 | Craig et al. | 379/230 |
| 7,257,218 B2 * | 8/2007 | Yoakum | 379/265.01 |
| 7,412,038 B2 | 8/2008 | Creamer et al. | |
| 2002/0114441 A1 * | 8/2002 | Coussement | 379/265.06 |
| 2003/0215083 A1 * | 11/2003 | McPartlan et al. | 379/265.02 |
| 2004/0133641 A1 | 7/2004 | McKinnon et al. | |
| 2005/0195962 A1 * | 9/2005 | Brown | 379/265.02 |
| 2007/0003024 A1 * | 1/2007 | Olivier et al. | 379/45 |

* cited by examiner

METHOD AND SYSTEM FOR MONITORING AND MANAGING MULTI-SOURCED CALL CENTERS

RELATED APPLICATIONS

This application is a CONTINUATION of U.S. patent application Ser. No. 11/285,599, filed 22 Nov. 2005, now U.S. Pat. No. 7,738,646 which claims priority to U.S. Provisional Application 60/630,851, filed 23 Nov. 2004, each of which is incorporated herein by reference.

FIELD OF THE INVENTION

The present invention relates generally to managing call center activity and, more specifically, managing and monitoring calls associated with multi-sourced call centers.

BACKGROUND OF THE INVENTION

Customer support systems provide a customer a line of communication to a product or service provider by providing a convenient means for connecting to an enterprise call center that may include an automated service and support system and/or a live service agent. Once connected, a customer may place an order or request support by perusing an automated menu or by discussion with a service agent. However, because an enterprise requires a minimum service quality level to keep their customers happy, these systems require several technical features, such as call load balancing, queuing, system performance report generation, call monitoring, etc. These features are generally implemented by disparate technologies from multiple vendors and are generally expensive to create, run and maintain.

In developed countries, the most significant operating cost of call centers is the salary of the service agent. Enterprises have spent millions of dollars to reduce this cost, including implementing caller self-service features to handle routine tasks (e.g., IVR—interactive voice response) and moving call centers to rural areas where salaries are lower.

Outsourcing call centers (to $3^{rd}$ party vendors) has also become a prevalent practice to reduce costs. Initially, enterprises were reluctant to outsource their core and critical business processes as well as provide access to critical customer data. Recently, however, technology has become available whereby enterprises can provide limited access to customer data in a secure manner and provide training for an outsourced service agent to take a customer call.

Additionally, enterprises have also discovered the advantages of using offshore labor for various IT (information technology) projects. Utilizing this labor force is referred to as off-shoring which takes advantage of lower-cost labor in another country. Off-shoring may be to an enterprise's own workforce/employees offshore (captive) or may be outsourced to a third party's workforce offshore (e.g., a third party call center vendor). Additionally, the build up of significant international bandwidth by global telecom carriers has added to the desirability to offshore and take advantage of the low-labor costs for front-office applications such as call centers.

The convergence of enabling technologies, availability of international bandwidth and access to an educated, lower cost overseas work force has caused a new and emerging trend in off-shoring call centers. A number of outsourcers have sprung up in the offshore call center industry. They take advantage of the enabling remote desktop technologies to let an enterprises project the CRM (customer relationship management) applications to the offshore screen and keyboard. The outsourcers typically utilize private E-1 (2 Mb/sec) dedicated links to carry compressed voice traffic and/or data offshore, handling around 200 calls per E-1 circuit. Since each circuit costs a flat amount per month, the outsourcers have an average voice call rate of about $0.03/minute. By comparison, transporting a voice call through the conventional switched network would cost up to ten times that amount.

Enterprises that choose to offshore their call centers have a choice of either creating their own captive call centers or outsourcing the call centers to a third party. Setting up a captive center has fixed costs. One scenario may be for an enterprise to incur a minimum fixed cost, such as having at least one captive center and utilize an outsourcer(s) to cover the variable demand as needed. A large enterprise may use a combination of captive and more than one outsourcer (national and international) to handle their call volume.

However, there are many issues that arise with off-shoring call centers. Most issues with offshore call centers arise from the geographic and organizational separation of the call center from the enterprise. Organizational separation is tolerated in the case of nationally based outsourcers (e.g., enterprise and outsourcers within U.S. borders) because of cultural homogeneity combined with the easy and relatively inexpensive access to the delivery centers for oversight by the enterprise. However, with international outsourcers (e.g., outsourcers in the Philippines, India, etc.), these attributes are lost, and organizational separation becomes a larger issue, particularly in monitoring and managing incoming calls.

SUMMARY OF THE INVENTION

In various implementations the present invention provides methods and systems for managing call center activity and, more specifically, managing and monitoring calls associated with multi-sourced call centers. For example, in one such embodiment a mid-point call management node subject to monitoring through a workstation communicatively coupled thereto, provides call services (e.g., through extensible markup language (XML), and in particular call control extensible markup language (CCXML) and/or voice extensible markup language (VXML), instructions) for an inbound call received from an originating network at an originating point-of-presence (POP) associated with multiple, disparate call centers, the call services being provided in response to call management application instructions issued according to enterprise-specific strategies for optimizing call handling between the originating POP and domestic and/or international ones of the disparate call centers communicatively coupled thereto. Call center information (e.g., call load information) received at the management node from the multiple call centers may be used in connection with providing the call services. The enterprise-specific strategies may be instantiated as processes for: call routing, load balancing, work force management, and/or customer relationship management.

Inbound calls may be monitored via the workstation communicatively coupled to the mid-point call management node. Such monitoring may include, for example, transferring the inbound call between different ones of the call centers, listening in on an inbound call, recording an inbound call, queuing an inbound call, and/or reporting an inbound call.

Where the inbound call is directed, in accordance with the call management application instructions, from the originating POP to a remote POP associated with a selected call center at which the inbound call is to be serviced, it may be so directed via a mesh network established between trunking gateways resident at the originating POP and the remote POP. Alternatively, or in addition, the inbound call may be directed to the remote POP as a voice over Internet Protocol (VoIP) communication. In some cases, the inbound call may be directed to a particular call center in response to a communication failure in a transit network communicatively coupling the originating POP with other call centers. The remote POP may terminate the inbound call into an automatic call distributor and/or private branch exchange associated with the selected call center.

In some cases, the inbound call may be received at a call control gate way, for example a media gateway, of the originating POP. Call services such as call routing, call transfer, call queuing, call recording, and/or call monitoring may then be provided, at least in part, through that media gateway.

A call control gateway configured in accordance with embodiments of the present invention includes a session initiation protocol (SIP) call controller coupled to a call manager. The call manager is generally configured to: (i) receive information concerning inbound calls received at an originating POP communicatively coupled with various call centers, (ii) expose call, network and agent object models representing embodiments of a call handling system including the call centers to a session manager of the call control gateway for manipulation by said session manager, and (iii) provide the session manager with call-, network- and agent-related events from the call handling system. The session manager is generally configured to retrieve instructions for manipulating the call, network and agent objects and to react to the call-, network- and agent-related events so as to optimize handling of the inbound calls according to the enterprise-specific strategies for the call handling system.

The session manager instructions may be included in XML, CCXML and/or VXML documents. Hence, the session manager may be configured to retrieve those documents from uniform resource locators (URLs) associated with a document manager of the call control gateway using hyper text transfer protocol (HTTP) requests.

The call-, network-, and agent-related events may include: call received indicators, call connected indicators, agent busy indicators, network element down indicators, and/or agent logged in/out indicators. An instance of the call model may be instantiated for each of the inbound calls, while an instance of the agent model may be instantiated for each call center agent assigned to each of those calls. The network model maintains state information regarding the call handling system.

A network events manager may be communicatively coupled to the session manager (e.g., through the call manager) and configured to receive events indicative of whether or not particular network elements and links within the call handling system are either in service or out of service. Further, an agent event manager may be communicatively coupled to receive events indicative of current states of identified call agents using the call handling system and to notify the call manager of said states of the identified agents. The agent event manager may receive events over SIP via Presence extensions and SIMPLE (SIP for Instant Messaging and Presence Leveraging Extensions). The states of the identified agents can include states such as: available to handle calls, busy handling a call, and/or unavailable between calls.

A call management server configured in accordance with an embodiment of the present invention includes a management framework configured as a common layer for handling requests from call control gateways and media servers deployed within originating POPs in a call handling system. The POPs may be configured to handle inbound calls and to respond to the call control gateway's requests with instructions for manipulating call, network and agent objects and to react to call-, network- and agent-related events so as to optimize handling of the inbound calls according to enterprise-specific strategies for the call handling system. The POPs' instructions may be included in XML (e.g., VoiceXML and/or CCXML) documents, while various instantiations of the enterprise-specific strategies for the call handling system may include media and call management applications, which the call management server may execute. Finally, the call management server may include a call queue for queuing the inbound calls until an agent at one of the call centers becomes available, a call recorder configured to record selected ones of the inbound calls, and/or a call monitor configured to permit monitoring of selected ones of the inbound calls at a midpoint call management node.

Of course the above descriptions are merely meant to encompass examples of implementations of the present invention and should not be read as limiting the broader aspects thereof, as discussed below.

BRIEF DESCRIPTION OF THE DRAWINGS

The present invention is illustrated by way of example, and not limitation, in the figures of the accompanying drawings, which illustrate various embodiments of the present invention.

DETAILED DESCRIPTION

The present invention provides systems and methods for an enterprise to manage and monitor call traffic destined to offshore (international) and/or onshore (national) call centers. In one embodiment, portions of a system executing one embodiment of the present methods to manage and monitor the incoming calls may be remote to a first network server coupled to an originating network and a transit network, and a second network server coupled to an outsourced call center and the transit network. For simplicity, the examples provided herein discuss managing and monitoring one call, however, it may be appreciated that the present methods and systems may be used to manage and monitor a plurality of incoming calls distributed among a plurality of domestic and international call centers via a plurality of domestic and international points of presence (POPs) communicatively coupled to a plurality of data centers.

Figure 1:
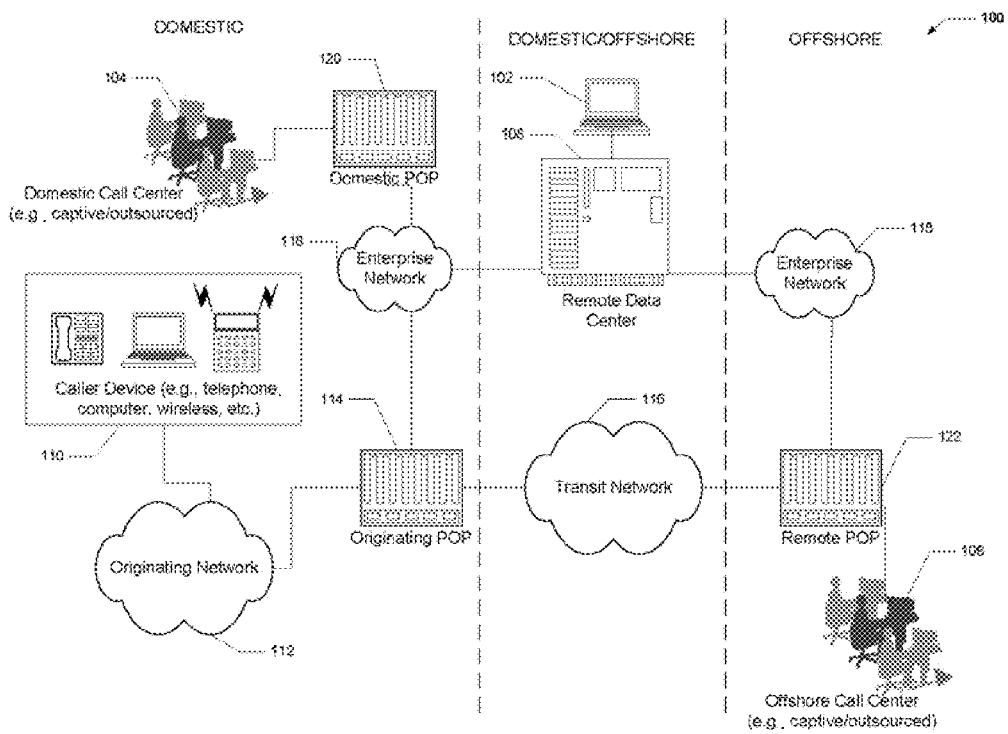
FIG. 1 illustrates a multi-source call management system configured according to one embodiment of the invention.

FIG. 1 illustrates a multi-source call management system 100, according to one embodiment of the invention. The system 100 may provide a user 102 (e.g., enterprise call manager) visibility to incoming calls received at domestic and offshore call centers 104 and 106, respectively, through remote data center 108. These call centers may be operated by the enterprise (captive) and/or outsourced to third party call center providers.

Generally, a call originates domestically from a caller device 110, such as a telephone, computer, wireless, or other communication device. For example, a caller may wish to reach customer support for a product through a customer support phone number or an Internet site utilizing a contact feature such as live chat. The call is placed through network 112 and is received at an originating point of presence (POP) 114. The network may be a telephone network (e.g., long distance carrier), the Internet, or other voice and/or data network. As shown, the originating POP may be connected to a transit network 116 and an enterprise network 118, such as a wide area network or other network that may provide remote connectivity to the remote data center 108. The enterprise network 118 may also provide remote data center 108 connectivity to a domestic POP 120 and a remote POP 122, each of which are communicatively coupled to the domestic call center 104 and offshore call center 106, respectively. However, in varying embodiments, it may be the case that the enterprise network 118 communicatively coupled to each POP may be more than one network or network type (e.g., networks having different protocols, physical connectivity, etc.).

The remote data center 108 may receive incoming call data from the originating POP 114 and call center data from the remote POP 122 through the transit network 116 and the enterprise network 118, respectively. The remote data center 108 may then process the received data to determine call parameter data, such as optimum call routing based on call loading at various call centers, call type (e.g., customer service, account information, etc.), and call format (e.g., packet type, Internet protocol, etc.). The call may then be connected through the transit network 116 from the originating POP 114 to the remote POP 122 or domestic POP 120 to the offshore or domestic call centers 106, 104, respectively, based upon the processed call parameters. Once connected, the user 102 may remotely monitor the progress of incoming calls through the remote data center 108.

The user 102 may monitor the incoming call at a workstation communicatively coupled to the remote data center 108. The user 102 and workstation may be local to the remote data center 108 or may be remote and connected via a communications network, such as the Internet or a dedicated data line (not shown). Monitoring may include passive and active functions, such as real-time call reporting, call transferring between call centers (e.g., international and domestic), listening in on a call between the agent and/or customer, recording a call, and queuing a call until a remote agent becomes available.

Figure 2:
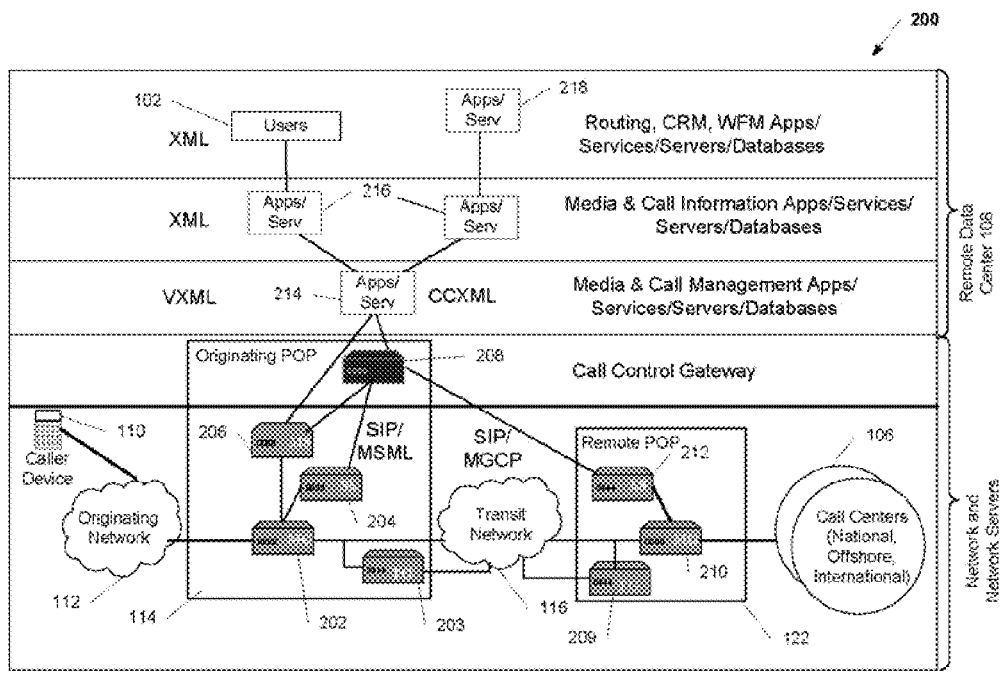
FIG. 2 illustrates the multi-source call management system configured according to one embodiment of the invention, and more specifically, equipment, services, and applications that may be associated with the data center and originating and remote POPs.

FIG. 2 illustrates a multi-source call management system 200, according to one embodiment of the invention, and more specifically, equipment, services, and applications that may be associated with the remote data center 108 and originating and remote POPs 114 and 122, respectively. The enterprise network 118 has been omitted for clarity, as has the domestic POP 120 that may have substantially similar equipment to that of the remote POP 122.

As shown in the illustration, the originating network 112 may deliver an incoming call from caller device 110 to the transit network 116 through the originating POP 114. The originating POP 114 may include a media gateway 202, signaling server 204, media server 206, and a call control gateway 208. Media gateway 202 is used to terminate the inbound call. Among various embodiments, the transit network 116 may use communication protocols such as VoIP (voice over Internet protocol) and/or TDM (Time Division Multiplexing) private links to transport the call to the remote POP 122. The TDM private links may be point-to-point private links that carry multiple phone calls over transport modes such as ATM (asynchronous transfer mode). For example, a mesh network of this type may be implemented between trunking gateways, such as trunking gateways 203 and 209, that compress the phone calls which ingress from the originating network 112 to the media gateway 202 and egress towards the remote POP 212 through media gateway 210 and subsequently to the call centers 106. In some cases, a small VoIP network is created within the originating POP 114 in front of or behind trunking gateways 203 and/or 209, respectively.

The transit network 116 may be constructed using International Private Leased Circuits (IPLC), which are available from multiple international carriers. An IPLC is a point-to-point leased line of a particular bandwidth. Typically, an IPLC is terminated domestically by one of the major long distance carriers, which transports the circuit to a meet point offshore where it is handed off to a local carrier that delivers the bandwidth to the remote end point (e.g., remote POP 122). The builder of the transit network 116 chooses whether the circuit carries IP (Internet protocol). ATM or other traffic. Many networks are built using TDM equipment, with the voice traffic being compressed and placed on ATM PVCs (permanent virtual circuits) between the originating POP 114 and an offshore location. The originating network 112 delivers the voice call to the originating POP 114, and the remote POP 122 terminates the call into an ACD (automatic call distributor) or PBX (private branch exchange). In some cases, a network or networks may use IP as the transport when the decision is made to provision the call center agents with IP phones. If a call is unable to be delivered to the offshore call center 106 due to a communication failure within the transit network, the call may be transferred out of the originating POP 114 to a domestic center 104, either through the domestic POP 120 or directly from the originating POP 114.

The media gateway 202 receives the call and the dialed number from the carrier. It may also receive the calling party ID (identification) as an ANI (automatic number identification). The call control gateway 208 may use a signaling protocol, such as Session Initiation Protocol (SIP) to initially set up and manage the incoming call. Specifically, the call control gateway 208 communicates with the signaling system 204 of the originating POP 114, the signaling system 212 of the remote POP 122, and the remote data center 108 to determine proper call routing through the transit network 116 and remote POP 122. The remote POP 122 may also include a media gateway 210 to reformat the incoming call from the transit network to a format compatible with the call center 106. In one embodiment, the signaling system 204 is configured to signal a primary signaling system, such as call control gateway 208, and a secondary signaling system, such as the (actual) signaling system 212, in order to complete the call. This permits call completion using the secondary signaling system if there are any failures at the call control gateway 208. As the primary signaling controller, the call control gateway 208 participates in all the signaling.

The remote data center 108 may include various servers for running applications and services. For example, media and call management applications 214 may be configured to provide incoming call services through the call control gateway 208 and/or the media server 206. These services may be provided using protocols such as CCXML (call control extensible markup language) and VXML (voice XML), respectively. Some exemplary services include, but are not limited to, call routing and transfer services through the call control gateway 208 and queuing, call recording, and call monitoring through the media server 206.

The media and call management applications 214 may further be communicatively coupled to call information service 216 via a protocol such as XML. This layer of functionality receives call and event details from the call management applications 214. In some cases, call information applications 216 may use a storage means, such as information servers (not shown) to store received incoming call data in appropriate data stores (e.g., a database) and post process the data to create pre-defined reports and data sets for a requesting party such as user 102. The information servers may also store recordings of conversations that are collected by the media and call management applications 214 and correlate them with received incoming call details, such as caller and agent identification, length of calls, etc. In one embodiment, the call information applications 216 may perform media conversions (e.g., VXML-to-XML), if necessary, to incoming call data and/or call center data to facilitate communication with a platform associated with the user 102.

As shown, call information applications 216 may be communicatively coupled to enterprise applications 218. Enterprise applications 218 may include algorithms for processing and communicating data, such as call routing and load balancing data, work force management data (e.g., agent scheduling at call centers), report data, and CRM data (customer relationship management). Load balancing may become particularly critical in systems employing multiple offshore locations, especially for outsourcers because they may be handling multiple enterprises over their shared circuits. From an enterprise's perspective, the call needs to be balanced across captive and outsourced centers. This type of load balancing may be achieved within the originating network 112 (e.g., a long distance network) before delivering the call to a POP or after the call delivery, but across transit links, such as transit network 116.

A platform associated with user 102 may include various communication devices configured to communicate between the aforementioned servers and applications. For example, a web browser may be configured to provide a user 102 connectivity, visibility, and control to/of the various data and controls of the multi-source call management system 200 through one or a combination of the Internet, local area network(s), or wide area network(s). Such visibility and control may include the display of real time call event data (e.g., listening to an active call, etc.), overall system and subsystem (e.g., individual servers, gateways, and applications) performance, and access to controls affecting system performance algorithms, such as those responsible for call routing, load balancing, and work force management.

Figure 3:
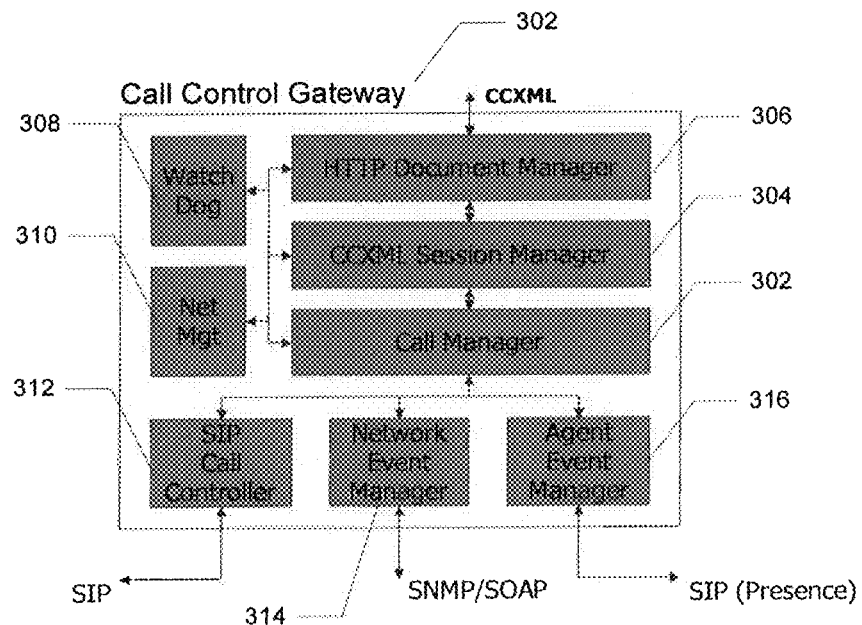
FIG. 3 illustrates exemplary components of a call control gateway configured according to one embodiment of the invention.

FIG. 3 illustrates components of an example of a call control gateway 302 that may be utilized in accordance with the present invention to provide necessary data and control to/of the various layers of servers and applications discussed above with reference to FIG. 2. The call control gateway 208 may include a SIP signaling stack and other event processing stacks coupled with a call manager 302 that exposes call, network and agent object models to a CCXML session manager 304. It will be appreciated that such components may be instantiated as software in some cases. The CCXML session manager 304 may obtain CCXML documents from various URLs using the HTTP (hyper text transfer protocol) document manager 306. The system management layer may consist of a watchdog 308 and network manager 310. The watchdog 308 may configure and monitor the system. Specifically, the watchdog 308 is a system management and supervisory process that is responsible for the proper operation of all the processes on a given node. The watchdog 308 has access to the process configuration data of a node and starts the required processes as needed and further provides configuration information to the processes it starts and maintains the current status of each of the managed processes by periodically polling them. The polling process is an active message exchange between the watchdog 308 and the managed process.

The network manager 310 provides real time management access to all components, such as the watchdog 308. HTTP document manager 306. CCXML session manager 304, and the call manager 302. The network manager 310 may be considered a system management interface that provides management access to clients (e.g., users) external to system for retrieving values of objects maintained within other processes operating in the system.

The call manager 302 maintains models of the call, network and agents, and allows manipulation of these objects by the CCXML session manager 304. The call manager 302 provides the CCXML session manager 304 with call, network, and agent related events. For example, these events may include such indicators as call received, call connected, agent busy, network element down, agent logged in or out of the system. etc. and may originate from a component below the call manager 302 (e.g., media server 206 and call control gateway 208).

The CCXML session manager 304 may fetch and interpret CCXML documents, which contain instructions to manipulate the call, network and agent objects. The CCXML documents may also contain instructions on how to react to specific events received from the call manager 302. The object models maintained by the call manager 302 include call, network and agent models. A call model may be instantiated per call and handled by the call control gateway 208. This model may include an embodiment of a true third party call control system such that the call control gateway 208 is a general purpose component on top of which applications, such as the media and call management applications 214 described above, may be built in a flexible manner. These applications may control the call control gateway 208 using CCXML+, which is based on the Voice Browser Call Control: CCXML v.1.0 specification published by the World Wide Web Consortium (W3C), but enriched to incorporate a true third party call model.

The call control gateway 208 is characterized as a Back-to-Back SIP UA (user agent), which is an intelligent proxy that may be configured to look like an end point to any signaling server connected thereto (e.g., signaling servers 204 and 212). The network model maintains the state of the network in order to achieve call handling reliability, typically generating events important to the applications driving the call control gateway 208. An agent model may be instantiated per agent that handles phone calls. This allows the agent to cycle through the various states—ready, not ready, wrap up, etc. These states cause events to be generated for handling by the CCXML session manager 304.

A network model is instantiated per transit network and tracks, at a high level, the states of network elements and links (up/down). This allows the system to maintain accessibility to each remote call center. Effectively, the call manager 302 treats each incoming call as two signaling legs, each associated with an end point, which establishes calls to multiple end points, if necessary, or breaks into an existing call (from a signaling perspective) and/or redirects the calls to alternate end points. This is the essence of a mid-point platform such as implemented by domestic long distance carriers who provide such features as in-network menus and call transfers triggered by DTMF (dual tone multi frequency) tones. Throughout the duration of an inbound call, the call control gateway 208 maintains track of the inbound call, and responds to DTMF tones generated by the agent side, which may be communicated as SIP INFO messages to the call control gateway 208. Alternatively, if the deployed media gateway cannot signal DTMF through SIP INFO, it may support the transport of DTMF by using special RTP packets. In this case, the media is forked, directing DTMF specific media at the call control gateway 208 while audio is exchanged between the actual call end points.

The SIP call controller 312 implements the SIP protocol, e.g. as specified in Request For Comments (RFC) 2543 as published by the Network Working Group of the Internet Engineering Task Force, and updated and revised from time to time. The network event manager 314 is a receiver of events over multiple mechanisms, which include SNMP (Simple Network Management Protocol) messages and web services using SOAP (Simple Object Access Protocol), indicating to the network event manager that a particular network element or link is either in service or out of service. The network event manager 314 conveys this information to the CCXML session manager 304 through the call manager 302, which utilizes the event management mechanism to convey this information to the CCXML session manager 304. This results in the application logic embedded in the CCXML document being executed to take the appropriate action as defined by the CCXML specification.

The CCXML specification is a W3C standard language for the expression of call control scripts. A call control script is essentially a state machine with a clearly identified state variable that responds to a set of events and specifics actions that are executed by the underlying machinery in reaction to the events depending on the value of the state variable. A set of events are defined in the CCXML specification itself and the CCXML specification also permits arbitrary user-defined events to be emitted and acted upon in the script. Further, the script allows changes to the value of the state variable as a execution step. Through these primitives, a state machine is specified by a CCXML document. Execution of the state machine code occurs when events generated by the underlying system triggers the execution facility to begin interpreting the CCXML document, using the value of the state variable, which identifies the block of code to be interpreted. This block of code then causes changes to the underlying system to take responsive action.

The agent event manager 316 may receive events over SIP via Presence extensions, SIMPLE (SIP for Instant Messaging and Presence Leveraging Extensions), or other equivalent mechanisms to indicate the current state of an agent that may be identified during login by an identifier such as "agent name". After logging in, agents may be available to handle calls, busy handling a call, or unavailable between calls or at other times. The events received may be passed to the call manager 302 and specifically to the call manager's object model (not shown) of the call, network and agent. The call manager's model generates a set of events to be handled by the CCXML session manager 304, which maintains an application view of these objects (calls, agents, network) and, depending on the application logic embedded in the CCXML session document, takes the appropriate action as defined by the CCXML specification. In addition to events related to agent state, the Agent Event Manager may send call associated data (such as a caller's telephone number and any other application-defined or computed information that might have been gathered or inferred in a previous interaction with an IVR) to the agent via the SIMPLE-based interface. This information would be logically delivered through the CCXML document(s) given to the CCXML session manager 302 at the time the corresponding call is being sent to the selected agent. At the agent's desktop that is contained in the call center 106, the same mechanism that generates the SIMPLE based presence information would display the call associated data. Furthermore, such a desktop interface would have the means to invoke another desktop application with some portion of the call associated data such that the appropriate customer interaction record for the caller would be brought up for the agent to review while interacting with the caller.

The call control gateway 208 may be deployed in a POP along with other transmission and signaling equipment and may further communicate with the rest of the elements of the architecture as a client of an application in a layer above server (see, e.g., FIG. 2). Since it may be a client system, a clean security boundary may be drawn between the call control gateway 208 and the layer above.

Figure 4:
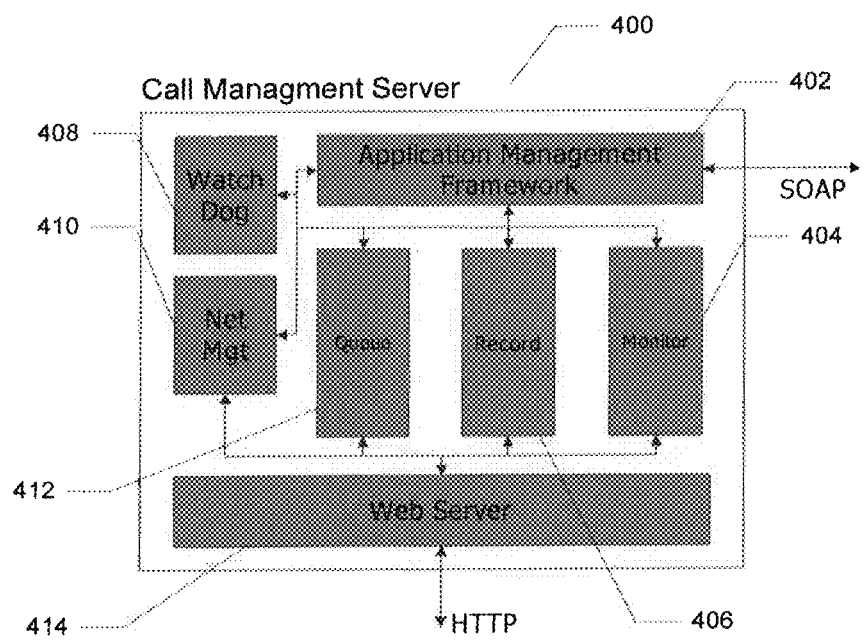
FIG. 4 illustrates components of a media and call management server for executing media and call management applications according to one embodiment of the invention.

FIG. 4 illustrates components of a media and call management server 400 for executing media and call management applications, according to one embodiment of the invention. As shown, at least one media and call management server 400 may be communicatively coupled to the call control gateway 208 and hosting media and call management applications 214. As mentioned above, these applications may use VoiceXML and CCXML to drive the call control gateway 208 or the media server 206 that participates in the call to provide necessary services.

Since both VoiceXML and CCXML ride on HTTP, which is wide-area friendly, these applications are hosted in the data center 108, and communicate with POP-based call control gateways and media servers. The architecture of the media and call management server 400 is similar to the call control gateway 208 in that all common systems management functions are leveraged. The main element of the media and call management server 400 is the management framework 402 that functions as the common layer for the handling of all requests from the various call control gateways deployed.

In one embodiment, each required feature set is implemented as a blade within the snap-in architecture of the application management framework. A blade is a software component that is logically added to the management framework 402 and adheres to the rules of the framework. The media and call management server 400 fields requests from media servers and call control gateways (e.g., media server 206 and call control gateway 208) deployed at various originating POPs and responds with an appropriate VoiceXML or CCXML document.

Watchdog 408 and network manager 410 may be functionally identical to watchdog 308 and network manager 310 as discussed above with reference to FIG. 3.

The queue 412, record 406, and monitor 404 are examples of modular functional components that have separate and modular functionality for performing their titled functions. For example, among other things the queue 412 may provide the functionality to queue calls until an agent becomes available, and record 406 and monitor 404 may provide the functions of recording and monitoring calls, respectively. Each of these modules is dependent on the application management framework to appropriately invoke their respective functionalities based on the requirements of a given call profile provisioned into the system. It can be appreciated that, although not illustrated, other functions may be implemented in the same modular fashion, such as calls transfer, call routing, load balancing, etc.

Figure 5A:
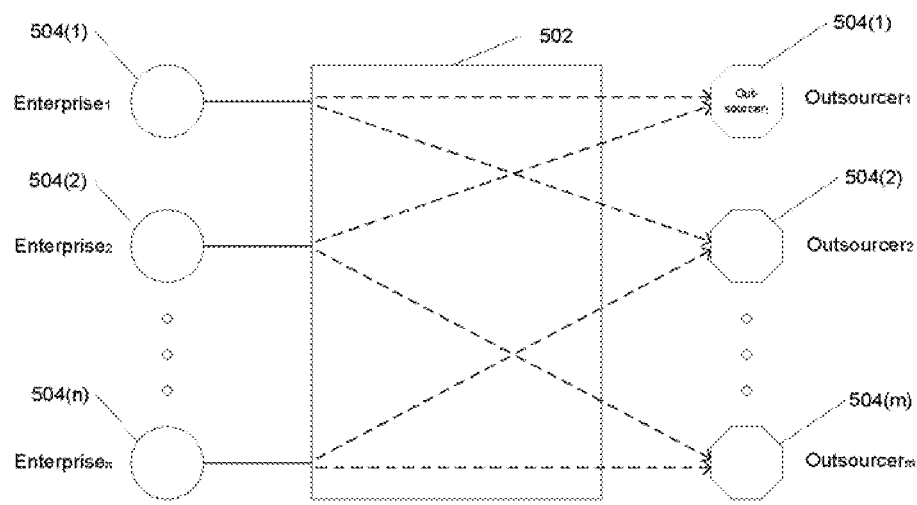
FIG. 5A illustrates connectivity of multiple enterprises to multiple outsourcers through a call management system configured according to one embodiment of the present invention.

FIG. 5A illustrates connectivity of multiple enterprises 504(1)-504(n) to multiple outsourcers 506(1)-506(m) through call management system 502, according to one embodiment of the present invention. As illustrated, an enterprise such as enterprise 504(1) may be connected to more than one outsourcer, such as outsourcers 506(1) and 506(2). In this example, enterprise 504(1) needs to manage the flow of calls and corresponding call data to optimize efficiency. Outsourcer call management consists of measuring and assessing key real time and historical metrics and comparing performance across outsourcers to optimize their service levels. For example, some common metrics are average call handling time, average queue time, and service level, which is defined as the percentage of calls being handled within defined time limits. Enterprises therefore may be able to utilize the call management system 502 to measure and assess their subset of calls when coupled to multiple outsourcers.

In other cases, an outsourcer may be coupled to and service more than one enterprise. For example, enterprise 504(1) and enterprise 504(2) may each utilize outsourcer 506(1). Therefore, call management system 502 must provide the outsourcer 506(1) with specific data and/or control to separately manage each enterprise's data (e.g., call data) to ensure enterprise data is protected (e.g., kept confidential/isolated) and each enterprise receives the appropriate service level.

Figure 5B:
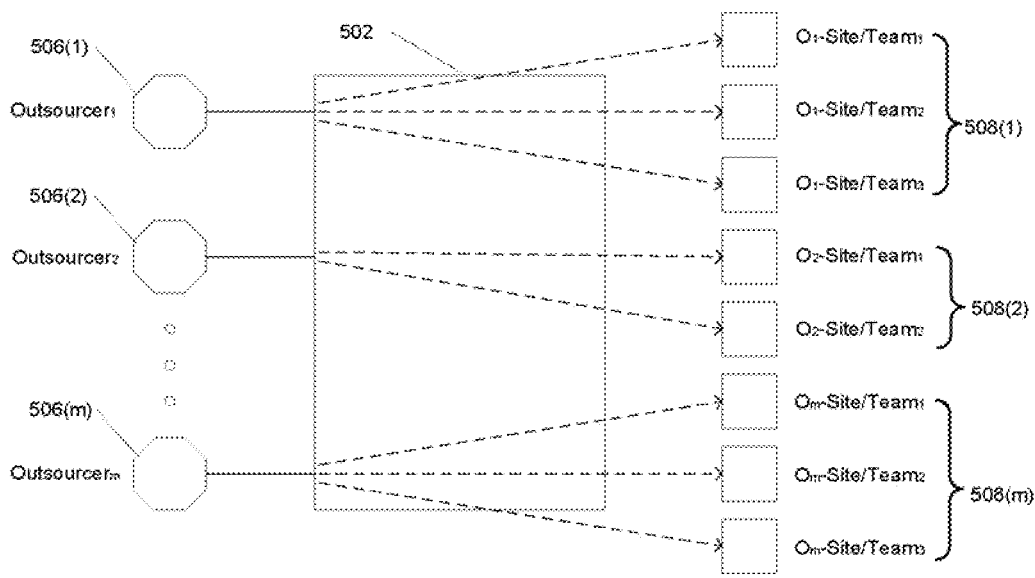
FIG. 5B illustrates multiple outsourcers utilizing a call management system configured in accordance with an embodiment of the present invention to distribute calls in real time across their respective sites and teams.

FIG. 5B illustrates multiple outsourcers 506(1)-506(m) utilizing the call management system 502 to distribute calls in real time across their respective sites and teams 508(1)-508(m) to globally optimize their resources and to provide visibility to their enterprise customers for account management and contract compliance. All features and functions of the call management system 502 are available to each outsourcer 506(1)-506(m) to address each associated enterprise's (e.g., such as enterprises 504(1)-504(n) discussed above with reference to FIG. 5A) respective requirements. Furthermore, the call management system 502 serves as an isolation gateway between the technologies deployed by the enterprise and those deployed by the outsourcer, alleviating the cost burden associated with seamless enterprise technology integration.

Figure 6:
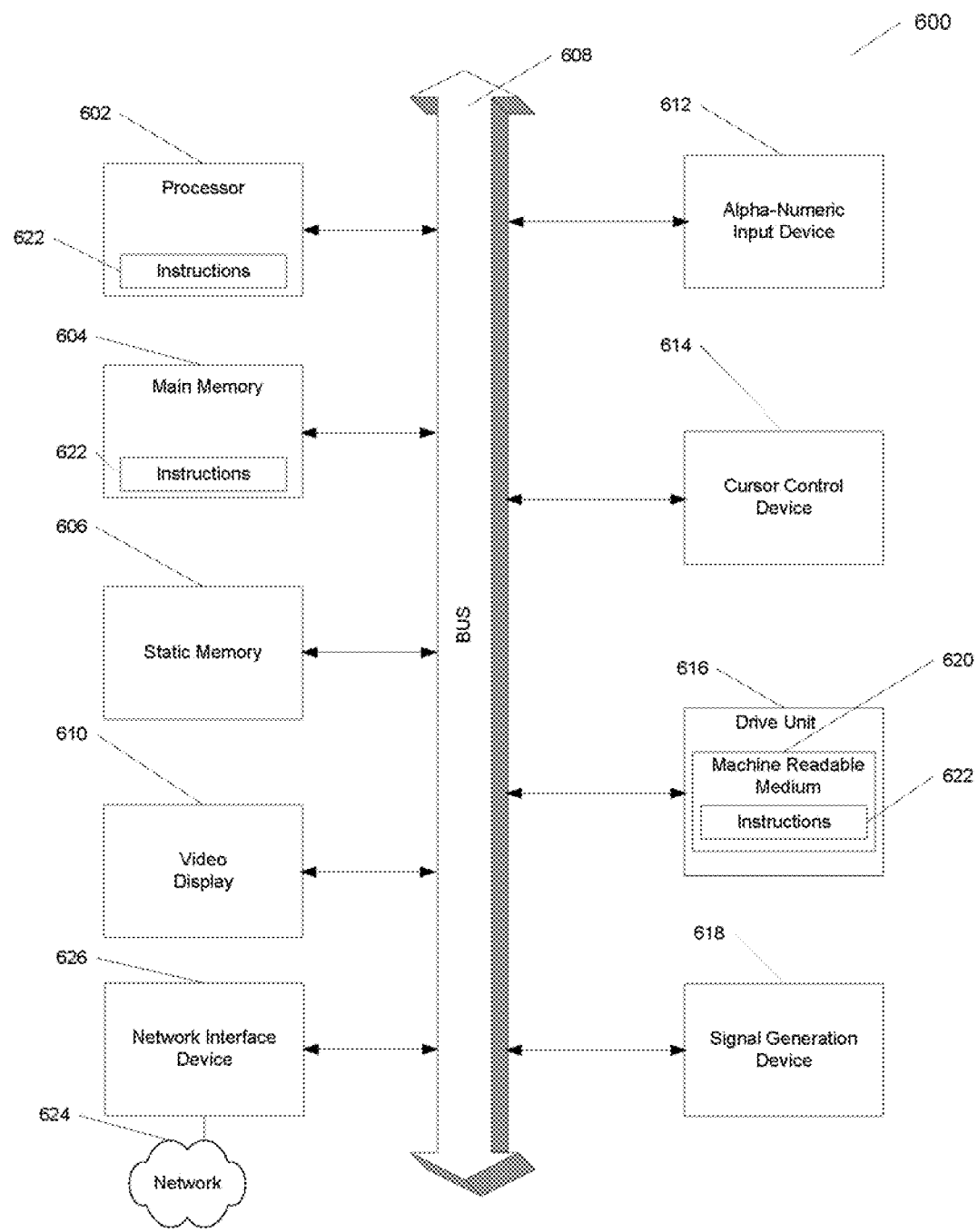
FIG. 6 illustrates a machine in the exemplary form of a computer system within which a set of instructions for causing the machine to perform any one or more of the methodologies discussed herein may be executed.

FIG. 6 illustrates a machine in the exemplary form of a computer system 600 wherein a set of instructions can be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment.

The machine can be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, and a signal generation device 618 (e.g., a speaker) and a network interface device 620.

The disk drive unit 616 includes a machine-readable medium 620 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604, and the instruction-storing portions of processor 602 also constituting machine-readable media. The software 622 may further be transmitted or received over a network 624 via the network interface device 626.

While the machine-readable medium 620 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, and optical and magnetic media.

Thus, systems and methods for an enterprise to manage and monitor call traffic destined to various call centers have been described. It should be appreciated, however, that the foregoing descriptions were intended to be illustrative only and the present invention should be measured only in terms of the claims, which follow.

What is claimed is:

1. In a communications network that includes a call management node communicatively coupled to an originating point of presence (POP) and a plurality of call centers, each of the plurality of call centers associated with a respective remote POP or domestic POP, a method, comprising:

receiving, at the call management node, (i) information concerning an inbound call received at a media gateway of the originating POP, and (ii) information from the respective remote POP or domestic POP concerning current call processing at the plurality of call centers, wherein the information concerning the current call processing at the plurality of call center includes call load information;

determining, by the call management node, call parameter data for the inbound call based on the information concerning the inbound call and the information concerning the current call processing at the plurality of call centers;

providing, from the call management node to a call control gateway communicatively coupled to the media gateway of the originating POP, call management instructions for the inbound call, the call management instructions being selected by the call management node according to the call parameter data and enterprise-specific strategies for optimizing call handling for a specific call center, the enterprise-specific strategies being specific to an enterprise other than an entity operating the call management node and the specific call center, wherein the call management instructions comprise instructions selected from a set including all of: call routing, call transfer, call queuing, call reporting, call recording, and call monitoring, and wherein the enterprise-specific strategies are instantiated as processes selected from a set including all of: call routing, load balancing, work force management, and customer relationship management;

monitoring, by a user, the inbound call at a workstation communicatively coupled to the call management node and a remote data center; wherein monitoring is selected from a set including all of: call transfer between the plurality of call centers, listening on a call between an agent and a customer, recording the call between an agent and a customer, and queuing a call until a particular agent is available; and providing, by the call management node, via the call control gateway of the originating POP, call connection for the inbound call with a selected call center of the plurality of call centers via a particular one of the respective remote POP or domestic POP associated with the selected call center, the call connection being provided by the originating POP in response to a call management application instructions issued by the call management node according to call parameter data and enterprise-specific strategies.

2. The method of claim 1, further comprising connecting the inbound call to the selected call center according to the call management instructions.

3. The method of claim 2, wherein the inbound call is directed to the selected call center as a voice over Internet Protocol (VoIP) communication.

4. The method of claim 2, wherein the inbound call is terminated into one of: an automatic call distributor associated with the selected call center, or a private branch exchange associated with the selected call center.

5. The method of claim 1, wherein the call management instructions comprise one of: extensible markup language (XML) instructions, call control extensible markup language (CCXML) instructions or voice extensible markup language (VXML) instructions.

6. A call handling system, comprising:
a plurality of call centers, each connected to an associated remote point of presence (POP) or domestic POP;
an originating POP having a media gateway, signaling server, media server, and a call control gateway and being communicatively coupled to receive an inbound call from a network at the media gateway;
and a midpoint call management node, communicatively coupled to receive (i) information concerning the inbound call from the call control gateway of the originating POP, and (ii) information concerning current call processing at each of the plurality of call centers from the associated remote POP or domestic POP, wherein, the midpoint call management node is configured to provide call object model, network object model and agent object models representing embodiments of the call handling system to a session manager of the call control gateway of the originating POP for manipulation by the session manager, the call object model representing the inbound call received at the call handling system, the network object model providing state information concerning the call handling system, and the agent object model representing a state of a call center agent within the call handling system, and to provide the session manager with call-related, network-related and agent-related events from the call handling system;

wherein the call control gateway further includes a network events manager configured to receive events indicative of whether or not particular network elements and links within the call handling system are either in service or out of service, the network event manager being communicatively coupled to the session manager through a call manager;

wherein the session manager of the originating POP is configured to retrieve instructions from the midpoint call management node for manipulating, in accordance with enterprise-specific strategies for call handling among call centers of the call handling system, the call object model, network object model and agent object model and reacting to the call-related, network-related and agent-related events to connect the inbound call to a selected call center of the plurality of call centers accordingly, the enterprise-specific strategies being specific to an enterprise other than an entity operating the midpoint call management node and the specific call center; and a workstation, communicatively coupled to a midpoint call management node and a remote data center allowing a user to monitor the inbound call; wherein monitoring comprises: call transfer between the plurality of call centers, listening on a call between an agent and a customer, recording the call between an agent and a customer, and queuing a call until a particular agent is available.

7. The call handling system of claim 6, wherein the call control gateway further includes an agent event manager communicatively coupled to receive events indicative of current states of identified call agents using the call handling system and to notify a call manager of the call control gateway of the current states of the identified agents.

8. The call handling system of claim 7, wherein the agent event manager receives events over SIP (session initiation protocol) via Presence extensions and SIMPLE (SIP for Instant Messaging and Presence Leveraging Extensions).

9. The call handling system of claim 7, wherein the current states of the identified agents comprise one or more of: available to handle calls, busy handling a call, and unavailable between calls.

* * * * *